United States Patent
Asada

(10) Patent No.: US 12,368,818 B1
(45) Date of Patent: Jul. 22, 2025

(54) METHODS AND SYSTEMS FOR MAINTAINING EYE CONTACT DURING AN ONLINE VIDEO MEETING

(71) Applicant: Boston Incubator Center, LLC, Waltham, MA (US)

(72) Inventor: Haruhiko Harry Asada, Lincoln, MA (US)

(73) Assignee: Boston Incubator Center, LLC, Lexington, MA (US)

( * ) Notice: Subject to any disclaimer, the term of this patent is extended or adjusted under 35 U.S.C. 154(b) by 375 days.

(21) Appl. No.: 18/098,602

(22) Filed: Jan. 18, 2023

Related U.S. Application Data

(60) Provisional application No. 63/300,517, filed on Jan. 18, 2022.

(51) Int. Cl.

| | |
|---|---|
| *H04N 7/15* | (2006.01) |
| *G06F 3/01* | (2006.01) |
| *G06T 7/73* | (2017.01) |
| *G06T 17/00* | (2006.01) |
| *G06V 10/74* | (2022.01) |
| *G06V 40/18* | (2022.01) |
| *H04N 7/14* | (2006.01) |

(52) U.S. Cl.
CPC .............. *H04N 7/152* (2013.01); *G06F 3/013* (2013.01); *G06T 7/73* (2017.01); *G06T 17/00* (2013.01); *G06V 10/761* (2022.01); *G06V 40/193* (2022.01); *H04N 7/147* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2018/0307310 A1* | 10/2018 | McCombe | G06F 3/04815 |
| 2019/0156100 A1* | 5/2019 | Rougeaux | G06V 40/161 |

* cited by examiner

*Primary Examiner* — Amal S Zenati
(74) *Attorney, Agent, or Firm* — Spano Law Group; Joseph S. Spano

(57) ABSTRACT

Methods and systems for establishing and maintaining eye contact during an online video meeting are described herein. Multiple cameras capture images of a meeting participant from a number of different angles. A three dimensional model is determined based on the collected images. The three dimensional model is evaluated to determine the gaze direction of the participant. A two dimensional eye contact image of the participant is generated from the three dimensional model such that the plane of the two dimensional image is perpendicular to the gaze direction of the participant. This two dimensional eye contact image is then rendered on a display viewed by a remotely located meeting participant. Eye contact images of each participant are generated as described herein and presented to the remotely located meeting participant in real time. As a result, eye contact between both participants is established and maintained during the video meeting.

20 Claims, 3 Drawing Sheets

METHODS AND SYSTEMS FOR MAINTAINING EYE CONTACT DURING AN ONLINE VIDEO MEETING

CROSS REFERENCE TO RELATED APPLICATIONS

The present application for patent claims priority under 35 U.S.C. § 119 from U.S. provisional patent application Ser. No. 63/300,517, entitled "Eye-Contact Online Video Meeting System," filed Jan. 18, 2022, the subject matter of which is incorporated herein by reference in its entirety.

TECHNICAL FIELD

The described embodiments relate to systems and methods for online video meetings.

BACKGROUND INFORMATION

Eye contact is an important element of communication among people. Eye contact promotes understanding of the subject under discussion and conveys an emotional component attached to the conversation. In addition, eye contact fosters a more personal connection among participants in the conversation. It is very easy and natural to establish and maintain eye contact during in-person meetings of participants. Unfortunately, it is often difficult to establish and maintain eye contact during online video meetings. This limits communication efficiency and depth of mutual understanding.

Existing online video meeting systems include a camera and a display at each location. A local participant views images of a participant at a remote location rendered on the local display, and vice-versa. Each meeting participant naturally focuses attention on the images displayed on the local display because each participant seeks to establish eye contact with participants at remote locations. In other words, the natural response of each participant is to look directly at the images of the remote participants in an attempt to establish eye contact in the same way each participant would look directly into the eyes of the other participants if the meeting were in-person.

Unfortunately, the camera and display employed at each location are not co-located. Hence, each camera does not capture an image of a meeting participant looking directly at the camera. Instead each camera captures an image of a meeting participant gazing at a local display. As a result, the captured images rendered on a display visible to other participants at a remote location illustrate a participant who is not gazing back at them, but instead is gazing in some other direction.

One way to correct this mishap using a conventional online video meeting system is for each participant to look directly at the camera at their location when they are speaking and to look at the display when remote participants are speaking. In this manner, the images displayed at other locations will appear to show each participant looking at remote participants through their display when the participant is speaking. Unfortunately, this is unnatural and ineffective because the act of shifting one's gaze from the display to the camera when speaking breaks eye contact with the remote participants from the perspective of the speaking participant. Thus, there really is no effective way to maintain eye contact among all participants throughout the conversation using conventional online video meeting systems.

In summary, establishing and maintaining eye contact is a fundamental element of effective communication. Conventional online video meeting systems are not able to maintain eye contact throughout a conversation.

Improvements to online video meeting systems are desired to enable virtual meeting participants to establish and maintain eye contact throughout the meeting.

SUMMARY

Methods and systems for establishing and maintaining eye contact during an online video meeting are described herein. Multiple cameras capture images of a meeting participant from a plurality of different angles. A three dimensional model is constructed based on the collected images. The three dimensional model is evaluated to determine the gaze direction of the participant. A two dimensional eye contact image of the participant is generated from the three dimensional model such that the plane of the two dimensional image is perpendicular to the gaze direction of the participant. This two dimensional eye contact image is then rendered on a display viewed by a remotely located meeting participant. In this manner, the direction of gaze of the participant rendered on the display appears to be directed toward the remote participant.

Each participant in an online video meeting is within the field of view of multiple cameras and a display is located in the field of view of each participant. Eye contact images of each participant are generated as described herein and presented to the remotely located meeting participant in real time. In this manner, both participants view an image of the other participant that is aligned with each gaze direction, respectively. As a result, eye contact between both participants is established and maintained during the video meeting.

In another aspect, a misalignment between a location of gaze of a meeting participant on a display device and a location of the reference point associated with the eye contact image of the face of the remote meeting participant rendered by the display device is determined. If the magnitude of misalignment exceeds a predetermined threshold value for a period of time that exceeds a predetermined threshold value it is inferred that the meeting participant does not want to maintain eye contact, and generation of the virtual eye contact image of the remote meeting participant is suspended.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for establishing and maintaining eye contact during an online video meeting are described herein. Specifically, multiple cameras capture images of a meeting participant from a plurality of different angles. A three dimensional model is constructed based on the collected images. The three dimensional model is evaluated to determine the gaze direction of the participant. A two dimensional eye contact image of the participant is generated from the three dimensional model such that the plane of the two dimensional image is perpendicular to the gaze direction of the participant. This two dimensional eye contact image is then rendered on a display viewed by a remotely located meeting participant. In this manner, the direction of gaze of the participant rendered on the display appears to be directed toward the remote participant.

Each participant in an online video meeting is within the field of view of multiple cameras and a display is located in the field of view of each participant. Eye contact images of each participant are generated as described herein and presented to the remotely located meeting participant in real time. In this manner, both participants view an image of the other participant that is aligned with each gaze direction, respectively. As a result, eye contact between both participants is established and maintained during the video meeting.

Figure 1:
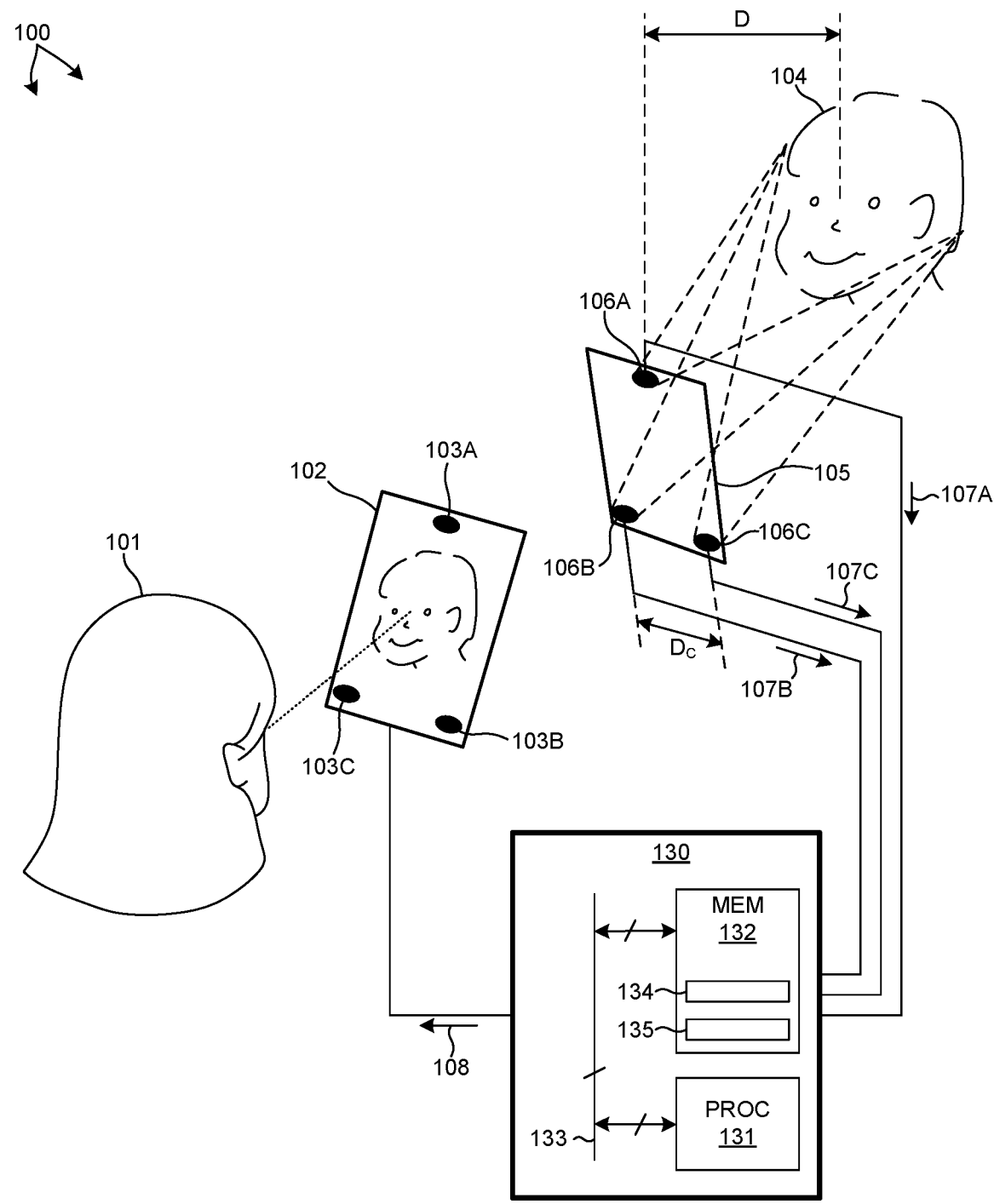
FIG. 1 is a diagram illustrative of an embodiment of a video meeting system 100 in at least one novel aspect.

FIG. 1 is a diagram illustrative of an embodiment of a video meeting system 100 in at least one novel aspect. As depicted in FIG. 1, a video meeting includes participants 101 and 104. Participants 101 and 104 are located away from each other and beyond visual sight of each other, i.e., they are located in different rooms, different buildings, different cities, etc.

A set of cameras are positioned to capture images of each participant. Multiple cameras, e.g., two or more, are employed at different positions with respect to each participant to capture images of the face of each participant from multiple directions. In some embodiments, three cameras are positioned to capture images of each participant from three different directions. As depicted in FIG. 1, cameras 103A-C are positioned to capture images of participant 101 from three different directions. As such, cameras 103A-C are positioned such that participant 101 is within the field of view of each of cameras 103A-C. Similarly, cameras 106A-C are positioned to capture images of participant 104 from three different directions. As such, cameras 106A-C are positioned such that participant 104 is within the field of view of each of cameras 106A-C.

Each participant is positioned to view a display device that renders images of the remote participant. Display device 102 is located in the field of view of participant 101. Similarly, display device 105 is located within the field of view of participant 104.

To ensure the images captured by each set of cameras capture enough information to generate a three dimensional model of the face of a meeting participant, the cameras should be spaced apart from one another by a minimum distance. In some embodiments, the distance, e.g., Dc, between each camera of a set of cameras is at least 10% of the distance, e.g., D, between the meeting participant being imaged and the display device in view of the meeting participant. In some embodiments, the distance between each camera of a set of cameras is at least 5% of the distance between the meeting participant being imaged and the display device in view of the meeting participant.

In some embodiments, the display and set of cameras associated with each meeting participant are integrated into a single electronic device, e.g., computer tablet, smart phone, computer monitor, etc. In some other embodiments, the display and set of cameras are not integrated into a single electronic device, e.g., discrete cameras and a monitor, etc. In these embodiments, for example, the cameras may be mechanically fixed to the room environment, e.g., walls, ceiling, furniture, etc., or other electronic devices, e.g., a computer monitor, etc.

As depicted in FIG. 1, computing system 130 is configured to receive images 107A-C of the face of participant 104 captured by cameras 106A-C, respectively. Computing system 130 generates an eye contact image 108 of participant 104. Computing system 130 communicates the eye contact image to display 102, which, in turn, renders the eye contact image of participant 104 in view of participant 101.

Similarly, computing system 130 performs the same functions, in reverse. Although, not shown explicitly, computing system 130 is also configured to receive images of the face of participant 101 captured by cameras 103A-C, generate an eye contact image of participant 101, and communicate the eye contact image to display device 105, which, in turn, renders the eye contact image of participant 101 in view of participant 104 in an analogous manner.

Figure 2:
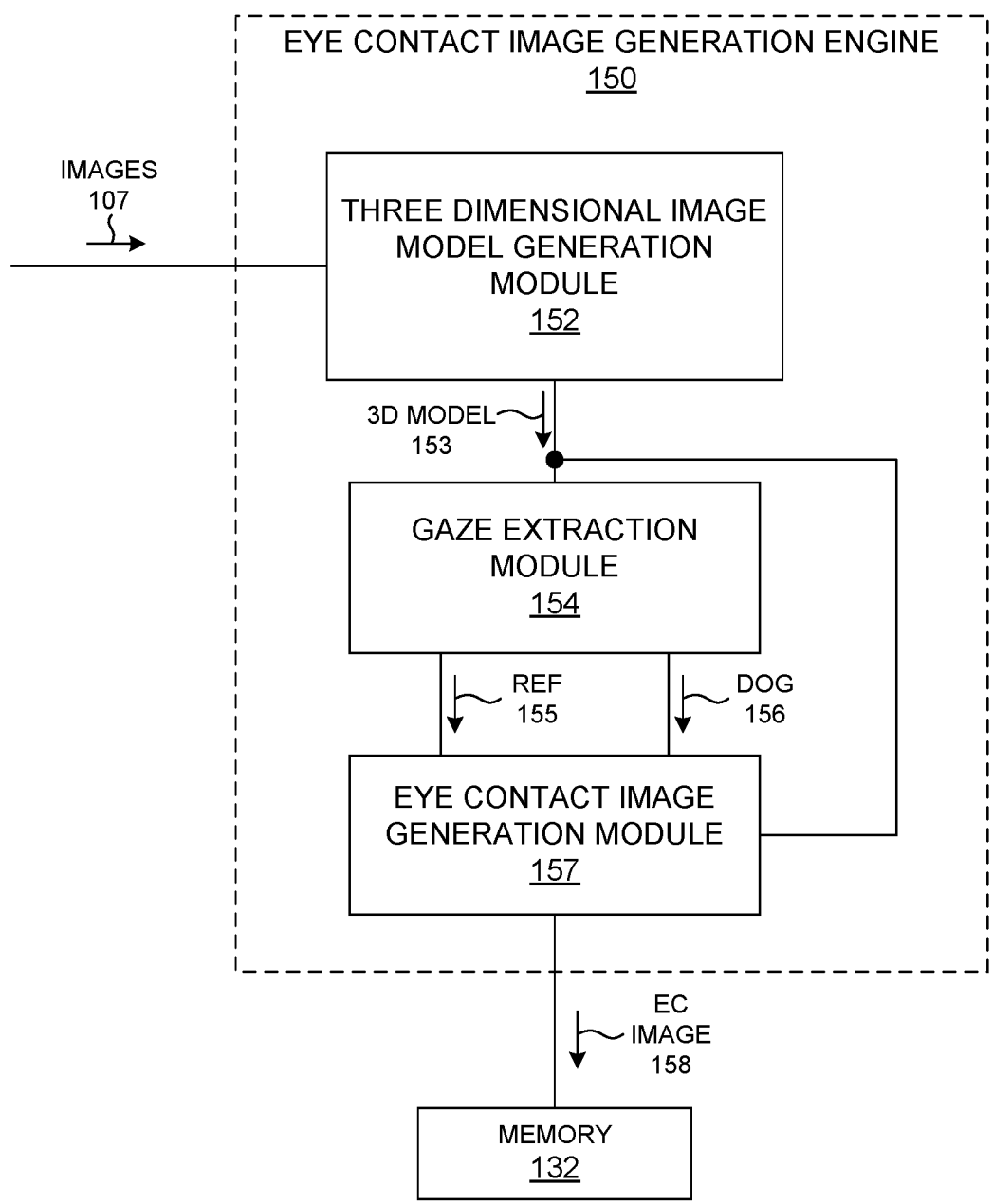
FIG. 2 is a diagram illustrative of an eye contact image generation engine 150 configured to generate eye contact images of meeting participants of a video meeting system in accordance with the methods described herein.

FIG. 2 is a diagram illustrative of an eye contact image generation engine 150 configured to generate eye contact images of a participant based on images captured from different directions. In one embodiment, depicted in FIG. 1, computing system 130 is configured as an eye contact image generation engine 150 to implement eye contact image generation functionality as described herein.

As depicted in FIG. 2, by way of non-limiting example, images 107A-C are received by three dimensional image model generation module 152. Images 107A-C include the face of participant 104 imaged from different directions. Three dimensional image model generation module 152 generates a three dimensional model of the face of meeting participant 104 based on images 107A-C. In some embodiments, three dimensional image model generation module 152 generates the three dimensional model using a photogrammetry technique, e.g., triangulation. In some embodiments, a trained neural network based model is employed.

As depicted in FIG. 2, the three dimensional model 153 is communicated to gaze extraction module 154 and eye contact image generation module 157. Gaze extraction module 154 determines a direction of gaze of the meeting participant 104 based on the three dimensional model. In some examples, the gaze direction is determined based on a relative position of features extracted from the three dimensional image model, e.g., features such as the pupil, iris, eye socket, etc. In some of these examples, the direction of gaze is determined by analyzing the location of each pupil with respect to the corresponding eye socket. The direction of gaze 156 is communicated to eye contact image generation module 157.

In some embodiments, a location of a reference point of the face of the meeting participant is also determined based on the three dimensional model. In some examples, a reference point location is determined based on locations of one or more facial features of the three dimensional model. In one example, a reference location is the middle point between the two eye pupils. In another example, a reference location is the middle point between two ear lobes. In another example, a reference location is the center point of a triangle formed by the two eye pupils and the mouth. In general, a facial feature of combination of features may be employed to determine a location of a reference point of the face of a meeting participant. In some examples, the relevant facial features of the three dimensional model are identified based on a pattern recognition technique and the distance between features is derived directly from the geometry of the three dimensional model. The location of the reference point 155 is communicated to eye contact image generation module 157.

As depicted in FIG. 2, eye contact image generation module 157 generates an eye contact image 158 of meeting participant 104 based on the three dimensional image model 153. In one example, the eye contact image 158 is a projection of the three dimensional image model 153 onto a plane perpendicular to the direction of gaze. In the embodiment depicted in FIG. 2, eye contact image 158 is stored in a memory, e.g., memory 132.

As depicted in FIG. 1, signals 108 indicative of eye contact image 158 are communicated to display device 102. In response, display device 102 renders eye contact image 158 on the viewable surface of display device 102. In some examples, the location of reference point 155 projected onto eye contact image 158 is employed to position eye contact image 158 on display device 102. In one example, the location of gaze of participant 101 on display 102 is determined by analysis of images collected by cameras 103A-C, and eye contact image 158 is rendered on display device 102 such that the location of reference point 155 is co-located with the location of gaze of participant 101.

Eye contact image generation engine 150 or another instance of eye contact image generation engine 150 is also configured to receive images of the face of participant 101 captured by cameras 103A-C, generate an eye contact image of participant 101, and communicate the eye contact image to display device 105, which, in turn, renders the eye contact image of participant 101 in view of participant 104 in an analogous manner. In this manner, a video stream of eye contact images is generated and presented to each meeting participant in real time.

In another aspect, a misalignment between a location of gaze of a meeting participant on a display device and a location of the reference point associated with the eye contact image of the face of the remote meeting participant rendered by the display device is determined. The location of gaze of the meeting participant is determined from the three dimensional model of the face of the meeting participant, the determined gaze direction of the meeting participant, and the location of the monitor with respect to meeting participant. The reference point of the eye contact image is rendered at a known location on the monitor. The misalignment is determined as the difference between these two locations.

It is expected that a meeting participant who desires to establish and maintain eye contact will gaze at or near the reference point of the eye contact image of the remote participant, e.g., midpoint between the eye pupils, etc. As such, the magnitude and duration of misalignment is a good indicator of whether the participant wants to establish and maintain eye contact, or not.

If the magnitude of misalignment exceeds a predetermined threshold value, e.g., greater than 10 centimeters, for a period of time that exceeds a predetermined threshold value, e.g., three seconds, it is inferred that the meeting participant does not want to maintain eye contact, and online video meeting system 100 suspends generation of the virtual eye contact image of the remote meeting participant. In this scenario, online video meeting system 100 simply renders images of the remote participant without eye contact correction.

It should be recognized that the various steps described throughout the present disclosure may be carried out by a single computer system 130 or, alternatively, a multiple computer system 130. Moreover, different subsystems of the video meeting system 100, such as the cameras 103A-C and 106A-C and display devices 102 and 105, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the cameras 103A-C and 106A-C and display devices 102 and 105 in any manner known in the art. For example, the one or more computing systems 130 may be coupled to computing systems associated with the cameras 103A-C and 106A-C and display devices 102 and 105, respectively. In another example, any of the cameras 103A-C and 106A-C and display devices 102 and 105 may be controlled directly by a single computer system coupled to computer system 130.

The computer system 130 may be configured to receive and/or acquire data or information from the subsystems of the system (e.g., cameras 103A-C and 106A-C and display devices 102 and 105, and the like) by a transmission medium that may include wireline and/or wireless portions. In this manner, the transmission medium may serve as a data link between the computer system 130 and other subsystems of the video meeting system 100.

Computer system 130 of the video meeting system 100 may be configured to receive and/or acquire data or information (e.g., images, etc.) from other systems by a transmission medium that may include wireline and/or wireless portions. In this manner, the transmission medium may serve as a data link between the computer system 130 and other systems (e.g., memory on-board video meeting system 100, external memory, or external systems). For example, the computing system 130 may be configured to receive images from a storage medium (e.g., memory 132) via a data link. For instance, images obtained using a camera may be stored in a permanent or semi-permanent memory device (e.g., memory 132). In this regard, the images may be imported from on-board memory or from an external memory system. Moreover, the computer system 130 may send data to other systems via a transmission medium. For instance, eye contact images 158 determined by computer system 130 may be stored in a permanent or semi-permanent memory device (e.g., memory 132). In this regard, images may be exported to another system.

In general, computing system 130 is a network based computing system having one or more elements communicatively linked to the first and second display devices and the first and second plurality of cameras. In some embodiments, computing system 130 includes local computing elements configured to perform some or all of the functionality described herein. Local computing elements includes computing hardware located on the same site as one or both meeting participants. In these embodiments, some or all image processing is performed by the local computing elements and images are communicated over a network that communicatively links the local computing elements with the cameras and displays located at each site.

In some embodiments, computing system 130 includes network based computing elements, e.g., cloud based computing elements, edge computing elements, etc. In these embodiments, the network based computing elements are configured to perform some or all of the functionality described herein. In some of these embodiments, images collected by cameras 103A-C and 106A-C are communicated to computing elements, e.g., one or more processors and memory, located in a cloud environment, and the image processing functionality described herein is performed by the cloud based computing elements. In some other embodiments, the image processing functionality described herein is performed by a combination of cloud based computing elements and local computing elements.

As depicted in FIG. 1, memory 132 includes an amount of memory 134 that stores eye contact images as described herein. Memory 132 also includes an amount of memory 135 that stores program code that, when executed by processor 131, causes processor 131 to implement eye contact functionality as described herein. Program instructions 135 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 135 are stored in a computer readable medium (e.g., memory 132). Exemplary computer-readable media include read-only memory, a random access memory, a magnetic or optical disk, or a magnetic tape.

Computing system 130 may include, but is not limited to, a personal computer system, a smartphone computing system, a tablet based computing system, a mainframe computer system, workstation, image computer, parallel processor, cloud computing system, edge computing system, or any other computing device known in the art. In general, the term "computing system" may be broadly defined to encompass any device, or combination of devices, having one or more processors, which execute instructions from a memory medium. In general, computing system 130 may be integrated with a tablet computer, laptop computer, desktop computer, smartphone, or alternatively, may be separate, entirely, or in part, from any of these devices. In this sense, computing system 130 may be remotely located and receive data and transmit image signals to any element of online video meeting system 100.

Figure 3:
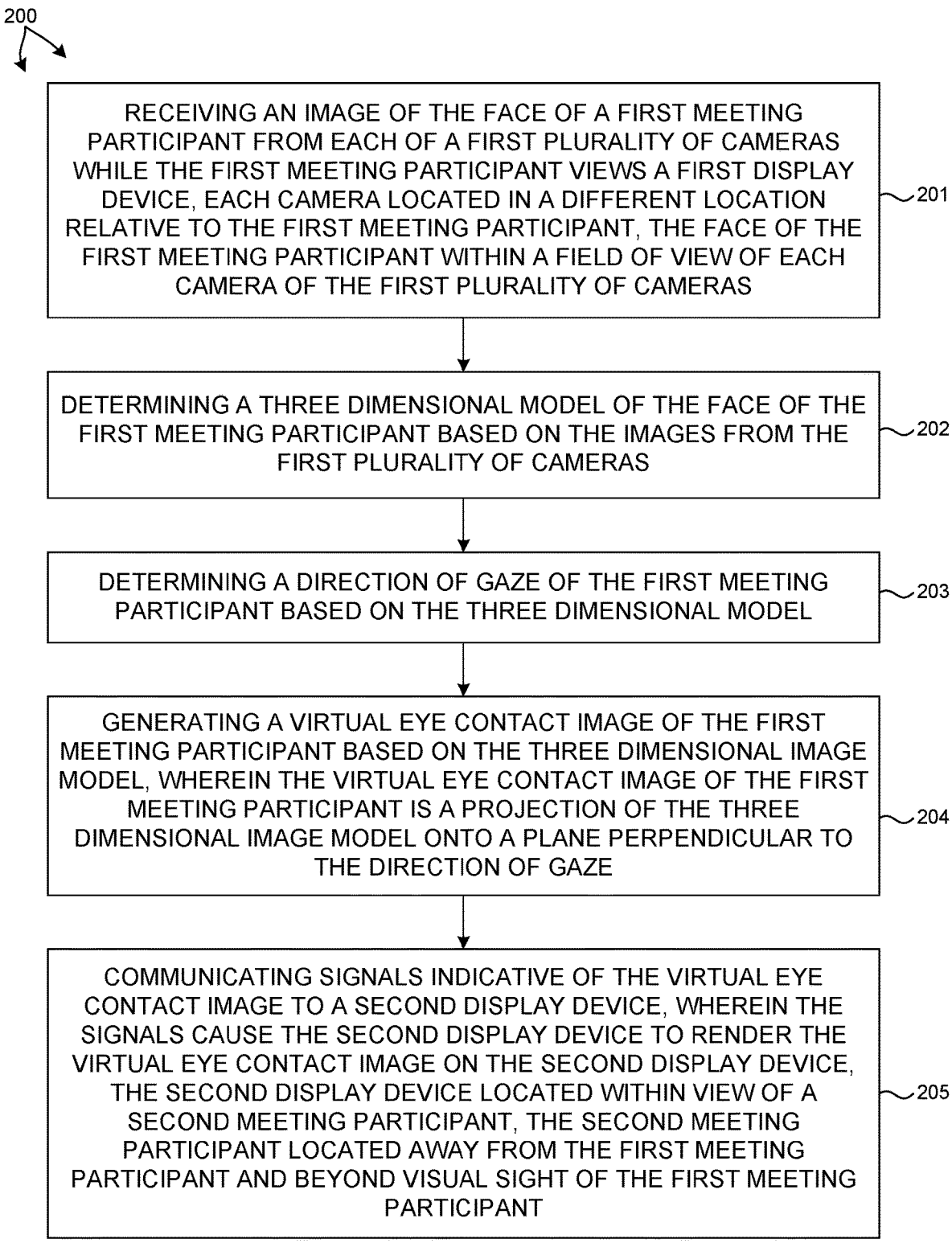
FIG. 3 illustrates a flowchart of a method 300 implementing eye contact image generation and rendering functionality as described herein.

FIG. 3 illustrates a flowchart of a method 200 suitable for implementation by an online video meeting system as described herein. In some embodiments, online video meeting system 100 is operable in accordance with method 200 illustrated in FIG. 3. However, in general, the execution of method 200 is not limited to the embodiments of online video meeting system 100 described with reference to FIGS. 1-2. These illustrations and corresponding explanation are provided by way of example as many other embodiments and operational examples may be contemplated within the scope of this patent document.

In block 201, an image of the face of a first meeting participant is received from each of a first plurality of cameras while the first meeting participant views a first display device. Each camera is located in a different location relative to the first meeting participant. The face of the first meeting participant is within a field of view of each camera of the first plurality of cameras.

In block 202, a three dimensional model of the face of the first meeting participant is determined based on the images from the first plurality of cameras.

In block 203, a direction of gaze of the first meeting participant is determined based on the three dimensional model.

In block 204, a virtual eye contact image of the first meeting participant is generated based on the three dimensional image model. The virtual eye contact image of the first meeting participant is a projection of the three dimensional image model onto a plane perpendicular to the direction of gaze.

In block 205, signals indicative of the virtual eye contact image are communicated to a second display device. The signals cause the second display device to render the virtual eye contact image on the second display device. The second display device is located within view of a second meeting participant. The second meeting participant located away from the first meeting participant and beyond visual sight of the first meeting participant.

In one or more exemplary embodiments, the functions described may be implemented in hardware, software, firmware, or any combination thereof. If implemented in software, the functions may be stored on or transmitted over as one or more instructions or code on a computer-readable medium, Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose of special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A video meeting system comprising:
   a first display device located within view of a first meeting participant;
   a first plurality of cameras, each camera located in a different location relative to the first participant, a face of the first meeting participant within a field of view of each camera of the first plurality of cameras;
   a second display device located within view of a second meeting participant, the second meeting participant located away from the first meeting participant and beyond visual sight of the first meeting participant;

a second plurality of cameras, each camera located in a different location relative to the second meeting participant, a face of the second meeting participant within a field of view of each camera of the second plurality of cameras;

a computing system configured to:
receive an image including the face of the first meeting participant from each of the first plurality of cameras;
determine a three dimensional model of the face of the first meeting participant based on the images from the first plurality of cameras;
determine a direction of gaze of the first meeting participant based on the three dimensional model;
generate a virtual eye contact image of the face of the first meeting participant based on the three dimensional image model, wherein the virtual eye contact image of the first meeting participant is a projection of the three dimensional image model onto a plane perpendicular to the direction of gaze; and
communicate signals indicative of the virtual eye contact image to the second display device, wherein the signals cause the second display device to render the virtual eye contact image on the second display device.

2. The video meeting system of claim 1, the computing system further configured to:
receive an image of the face of the second meeting participant from each of the second plurality of cameras;
determine a three dimensional model of the face of the second meeting participant based on the images from the second plurality of cameras;
determine a direction of gaze of the second meeting participant based on the three dimensional model of the face of the second meeting participant;
generate a virtual eye contact image of the second meeting participant based on the three dimensional image model of the face of the second meeting participant, wherein the virtual eye contact image of the second meeting participant is a projection of the three dimensional image model of the face of the second meeting participant onto a plane perpendicular to the direction of gaze of the second meeting participant; and
communicate signals indicative of the virtual eye contact image of the second meeting participant to the first display device, wherein the signals cause the first display device to render the virtual eye contact image of the second meeting participant on the first display device.

3. The video meeting system of claim 2, the computing system further configured to:
determine a misalignment between a location of gaze of the first meeting participant on the first display device and a location of the virtual eye contact image of the face of second meeting participant rendered by the first display device; and
suspend generation of the virtual eye contact image of second meeting participant if the misalignment exceeds a first predetermined threshold value for a period of time that exceeds a second predetermined threshold value.

4. The video meeting system of claim 1, wherein a distance between each camera of the first plurality of cameras is at least 10% of a distance between the first meeting participant and the first display device.

5. The video meeting system of claim 1, wherein the direction of gaze is determined based on a relative position of features extracted from the three dimensional image model.

6. The video meeting system of claim 5, wherein the features include any of a pupil, an iris, and an eye socket of the first meeting participant.

7. The video meeting system of claim 1, wherein the computing system is a network based computing system communicatively linked to the first and second display devices and the first and second plurality of cameras.

8. The video meeting system of claim 7, wherein at least a portion of the network based computing system is a cloud based computing system.

9. A method comprising:
receiving an image of the face of a first meeting participant from each of a first plurality of cameras while the first meeting participant views a first display device, each camera located in a different location relative to the first meeting participant, the face of the first meeting participant within a field of view of each camera of the first plurality of cameras;
determining a three dimensional model of the face of the first meeting participant based on the images from the first plurality of cameras;
determining a direction of gaze of the first meeting participant based on the three dimensional model;
generating a virtual eye contact image of the first meeting participant based on the three dimensional image model, wherein the virtual eye contact image of the first meeting participant is a projection of the three dimensional image model onto a plane perpendicular to the direction of gaze; and
communicating signals indicative of the virtual eye contact image to a second display device, wherein the signals cause the second display device to render the virtual eye contact image on the second display device, the second display device located within view of a second meeting participant, the second meeting participant located away from the first meeting participant and beyond visual sight of the first meeting participant.

10. The method of claim 9, further comprising:
receiving an image of the face of the second meeting participant from each of a second plurality of cameras while the second meeting participant views the second display device, each camera located in a different location relative to the second meeting participant, the face of the second meeting participant within a field of view of each camera of the second plurality of cameras;
determining a three dimensional model of the face of the second meeting participant based on the images from the second plurality of cameras;
determining a direction of gaze of the second meeting participant based on the three dimensional model of the face of the second meeting participant;
generating a virtual eye contact image of the second meeting participant based on the three dimensional image model of the face of the second meeting participant, wherein the virtual eye contact image of the second meeting participant is a projection of the three dimensional image model of the face of the second meeting participant onto a plane perpendicular to the direction of gaze of the second meeting participant; and
communicating signals indicative of the virtual eye contact image of the second meeting participant to the first display device, wherein the signals cause the first display device to render the virtual eye contact image of the second meeting participant on the first display device.

11. The method of claim 10, further comprising:
determining a misalignment between a location of gaze of the first meeting participant on the first display device and a location of the virtual eye contact image of the face of second meeting participant rendered by the first display device; and
suspending generation of the virtual eye contact image of second meeting participant if the misalignment exceeds a first predetermined threshold value for a period of time that exceeds a second predetermined threshold value.

12. The method of claim 9, wherein a distance between each camera of the first plurality of cameras is at least 10% of a distance between the first meeting participant and the first display device.

13. The method of claim 9, wherein the determining of the direction of gaze is based on a relative position of features extracted from the three dimensional image model.

14. The method of claim 13, wherein the features include any of a pupil, an iris, and an eye socket of the first meeting participant.

15. A video meeting system comprising:
a first display device located within view of a first meeting participant;
a first plurality of cameras, each camera located in a different location relative to the first participant, a face of the first meeting participant within a field of view of each camera of the first plurality of cameras;
a second display device located within view of a second meeting participant, the second meeting participant located away from the first meeting participant and beyond visual sight of the first meeting participant;
a second plurality of cameras, each camera located in a different location relative to the second meeting participant, a face of the second meeting participant within a field of view of each camera of the second plurality of cameras;
a non-transitory, computer-readable medium storing instructions that when executed by a computing system cause the computing system to:
receive an image including the face of the first meeting participant from each of the first plurality of cameras;
determine a three dimensional model of the face of the first meeting participant based on the images from the first plurality of cameras;
determine a direction of gaze of the first meeting participant based on the three dimensional model;
generate a virtual eye contact image of the face of the first meeting participant based on the three dimensional image model, wherein the virtual eye contact image of the first meeting participant is a projection of the three dimensional image model onto a plane perpendicular to the direction of gaze; and
communicate signals indicative of the virtual eye contact image to the second display device, wherein the signals cause the second display device to render the virtual eye contact image on the second display device.

16. The video meeting system of claim 15, the non-transitory, computer-readable medium further storing instructions that when executed by a computing system cause the computing system to:
receive an image of the face of the second meeting participant from each of the second plurality of cameras;
determine a three dimensional model of the face of the second meeting participant based on the images from the second plurality of cameras;
determine a direction of gaze of the second meeting participant based on the three dimensional model of the face of the second meeting participant;
generate a virtual eye contact image of the second meeting participant based on the three dimensional image model of the face of the second meeting participant, wherein the virtual eye contact image of the second meeting participant is a projection of the three dimensional image model of the face of the second meeting participant onto a plane perpendicular to the direction of gaze of the second meeting participant; and
communicate signals indicative of the virtual eye contact image of the second meeting participant to the first display device, wherein the signals cause the first display device to render the virtual eye contact image of the second meeting participant on the first display device.

17. The video meeting system of claim 16, the computing system further configured to:
determine a misalignment between a location of gaze of the first meeting participant on the first display device and a location of the virtual eye contact image of the face of second meeting participant rendered by the first display device; and
suspend generation of the virtual eye contact image of second meeting participant if the misalignment exceeds a first predetermined threshold value for a period of time that exceeds a second predetermined threshold value.

18. The video meeting system of claim 15, wherein a distance between each camera of the first plurality of cameras is at least 10% of a distance between the first meeting participant and the first display device.

19. The video meeting system of claim 15, wherein the direction of gaze is determined based on a relative position of features extracted from the three dimensional image model.

20. The video meeting system of claim 19, wherein the features include any of a pupil, an iris, and an eye socket of the first meeting participant.

* * * * *